(12) United States Patent
Shloush et al.

(10) Patent No.: US 6,297,612 B1
(45) Date of Patent: Oct. 2, 2001

(54) MOTION CONTROL COUPLING APPARATUS

(75) Inventors: Moshe Shloush, Knoxville; Gregory A. Davis, Maynardville; Benjamin D. Bower, Knoxville, all of TN (US)

(73) Assignee: Robotic Control Group, L.L.C., Oak Ridge, TN (US)

( * ) Notice: Subject to any disclaimer, the term of this patent is extended or adjusted under 35 U.S.C. 154(b) by 0 days.

(21) Appl. No.: 09/384,502

(22) Filed: Aug. 27, 1999

(51) Int. Cl.⁷ .................................................. G05B 19/18
(52) U.S. Cl. .................................................. 318/569; 318/562
(58) Field of Search .................................. 318/569, 574, 318/575, 600, 560, 562, 625

(56) References Cited

U.S. PATENT DOCUMENTS

| | | |
|---|---|---|
| 3,611,264 | 10/1971 | Ellis, Jr. . |
| 3,798,587 | 3/1974 | Ellis, Jr. et al. . |
| 3,945,706 | 3/1976 | Steiner et al. . |
| 4,750,960 * | 6/1988 | Bubeck ............................ 156/169 |
| 4,820,169 | 4/1989 | Weber et al. . |
| 4,977,359 | 12/1990 | Sawai et al. . |
| 5,035,566 * | 7/1991 | Sartorio et al. ..................... 414/729 |
| 5,241,380 * | 8/1993 | Benson et al. ..................... 358/108 |
| 5,415,570 | 5/1995 | Sarkissian . |
| 5,458,075 | 10/1995 | Tice et al. . |
| 5,532,533 | 7/1996 | Misutani . |
| 5,584,728 | 12/1996 | Cheng . |
| 5,621,292 | 4/1997 | Kokura et al. . |
| 5,627,721 | 5/1997 | Figueiredo et al. . |
| 5,741,153 | 4/1998 | Schwer . |
| 5,839,382 | 11/1998 | Tice et al. . |
| 5,912,541 * | 6/1999 | Bigler et al. ........................ 318/600 |
| 6,011,372 * | 1/2000 | Popovich, Jr. et al. ............ 318/560 |
| 6,091,219 * | 7/2000 | Maruo et al. ....................... 318/562 |

* cited by examiner

Primary Examiner—Robert E. Nappi
Assistant Examiner—Rina I. Duda
(74) Attorney, Agent, or Firm—Luedeka, Neely & Graham, P.C.

(57) ABSTRACT

A motion control system includes a signal conduit to which the various devices of the system, such as a motion controller and motor drive modules, are linked. The modules are intertied such that the order of the modules along the signal conduit does not affect system operability. In one embodiment, the signal conduit includes a substantially rigid substrate having a plurality of electrically conductive lines formed in one or more layers of the substrate. The substrate may include a one-piece construction to which the motion controller, drives, and other devices are attached, or the substrate may be in the form of a plurality of couplers joined one to the other by connectors. For the latter, the various modules of the system include a coupler with connectors which allow the various modules to be easily connected without the need for any tools and without concern for the order in which the modules are attached. In another embodiment, a flexible cable (such as a ribbon cable) forms part or all of the signal conduit which connects the various devices of the system. In either embodiment, a "plug-and-play" motion control system is provided which requires little or no technical expertise to assemble, install, and operate.

23 Claims, 12 Drawing Sheets

MOTION CONTROL COUPLING APPARATUS

TECHNICAL FIELD

The present invention relates generally to motion control systems. More particularly, it relates to a motion control system configuration which greatly simplifies assembly, installation, maintenance, and operation of the system.

BACKGROUND

Motion control systems can be designed as open loop or closed loop systems. An open loop system usually includes a controller and a motor connected to a drive with no feedback devices. A closed loop system is typically a controller and a motor connected to a drive with feedback devices also connected between the motor and the controller, forming the closed loop.

In a typical multi-axis closed loop system, such as a servo motor-based configuration, a motion controller is wired to a power supply. The motion controller is then wired or connected to a breakout box. Each axis in the system requires a drive amplifier, which also must be wired to a power supply. The control lines from the motion controller to the drive are connected through the breakout box. Connected to each drive is one servo motor. Commands and power between the drive and the motor are connected through a series of command lines. Encoders on the servo motor provide position feedback to the motion controller and are connected through a series of lines to the break-out box.

Each axis in a motion control system typically includes a series of limit switches or home switches. These are also connected to the breakout box. A single axis in a typical multiaxis system can have, for example, 32 individual connections. An eight-axis system might have over 260 individual connections. A system with this many connections is very complicated, time consuming to install, and requires extensive knowledge and experience on the part of the technician installing the system. Systems such as this are prone to miswiring and other costly mistakes during installation. After the system is installed, future maintenance and repairs are also complicated and prone to mistakes.

What is needed, therefore, is a system and method for simplifying the assembly, installation, maintenance, and operation of multiaxis motion control systems.

SUMMARY

With regard to the foregoing and other objects, the invention provides an expandable coupler system for electrically coupling signals between a motion controller and at least one motor drive of a motion control system. The coupler system includes a special conduit having a plurality of electrically conductive lines for conducting signals between the motion controller and at least one motor drive. The conduit includes a controller connector for connecting the motion controller to the conduit, a drive connector for connecting the motor drive to the conduit, and an expansion connector for connecting a further motion control device, such as a second motion controller or motor drive, to the conduit to expand the system. In this manner, the motion control system may be expanded to provide a multiaxis motion control system having a plurality of motor drives for driving a plurality of motors.

Various forms of the conduit may be employed in accordance with the invention. For example, the conduit may include a substantially rigid substrate with a plurality of electrically conductive lines formed in one or more layers of the substrate. Alternatively, the conduit may include a flexible electrical cable having a plurality of electrically conductive lines.

The present invention also provides an expandable motion control system for controlling operation of one or more motors. The expandable motion control system includes a substantially rigid substrate having a plurality of electrically conductive lines formed in one or more layers of the substrate. A motion controller provides motion control signals on electrically conductive lines of the substrate by way of a first connector, and a power connector provides electrical power signals on electrically conductive lines of the substrate. A first motor drive receives motion control signals and electrical power signals from the substrate and drives a motor, such as a servo motor, through its range of positions in response to the motion control signals. A second connector is configured for being connected to a further motion control device to expand the motion control system and thereby provide, for example, a multiaxis motion control system having multiple motor drives and multiple motors.

The substrate may be a single piece substrate, or it may include a plurality of interconnected, substantially rigid couplers with electrically conductive lines formed in one or more layers of each coupler. For example, the motion controller may include its own motion control coupler configured for connecting the motion controller with one or more similar couplers for the motor drives. A flexible electrical cable, such as a ribbon cable, may also be employed to interconnect two of the couplers.

In one embodiment, each of the motor drive couplers varies somewhat, as dictated by the particular axis to which the motor drive is assigned. In another embodiment, all of the motor drive couplers are substantially identical and include a selector for selecting certain ones of the electrically conductive lines for use by the motor drive. The selector may include a plurality of dip switches which can be manually set by the user. A more automated form of a selector includes a programmable electronic processor which is programmed to select desired ones of the electrically conductive lines.

The present invention also provides a multiaxis motion control system, which includes a multiaxis motion controller for providing motion control signals and a power supply for providing electrical power signals. An electrical conduit having a plurality of electrically conductive lines is employed to conduct the motion control signals and the electrical power signals. A plurality of motor drives are connected to the conduit to receive motion control signals and electrical power signals and to drive the motors through their ranges of positions with electrical power in response to the motion control signals. A plurality of monitors produce motion control signals substantially continuously corresponding to the positions of the motors. The monitor signals are conducted by the conduit to the motion controller for use in producing motion control signals. The motion controller, power supply, motors, monitors, and motor drives are electrically inserted along the conduit such that the order of position of each motor drive along the conduit does not affect operability of the system. If desired, a user interface, such as a computer or ON/OFF switch, may be employed for controlling operation of the system.

The system may include servo motors or stepper motors. The system may also include various types of I/O devices, such as a proximity sensor for sensing the position of a structural member being controlled by a motor. The proximity sensor provides a sensor signal which corresponds to the sensed position of the structural member. The motion controller receives the sensor signal and controls operation of the system based in part on the sensor signal.

The present invention also provides a method for controlling operation of one or more motors, where each motor is movable through a range of positions and is attached to a structural member whose movements are controlled by the motor. The method includes the step of providing an electrical conduit having a plurality of electrically conductive lines. Motion control command signals are produced with a multiaxis motion controller and provided on electrically conductive lines of the conduit. Electrical power signals are also supplied on electrically conductive lines of the conduit. A plurality of motor drives are connected to the conduit to drive the motors through their ranges of positions with electrical power in response to motion control signals. Monitor signals are provided which substantially continuously correspond to the positions of the motors. Monitor signals are conducted via the conduit and used by the motion controller to produce motion control command signals. The motion controller, motor drives, monitors, and power supply are electrically inertied along the conduit such that the order of position of each motor drive along the conduit does not effect operability of the system.

Finally, the present invention provides a coupler system for electrically coupling signals between a motion controller and motor drives of a multiaxis motion control system. The coupler system includes a conduit having a plurality of electrically conductive lines for conducting signals between the motion controller and the motor drives. One or more controller connectors are employed to connect the motion controller to the conduit. Likewise, the motor drives are connected to the conduit by one or more drive connectors. The motion controller and motor drives are electrically inserted along the conduit such that the order of position of each motor drive along the conduit does not affect operability of the coupler system.

BRIEF DESCRIPTION OF THE DRAWINGS

The above and other features, aspects, and advantages of the present invention will now be discussed in the following detailed description and appended claims considered in conjunction with the accompanying drawings in which:

DETAILED DESCRIPTION OF A PREFERRED EMBODIMENT

Figure 1:
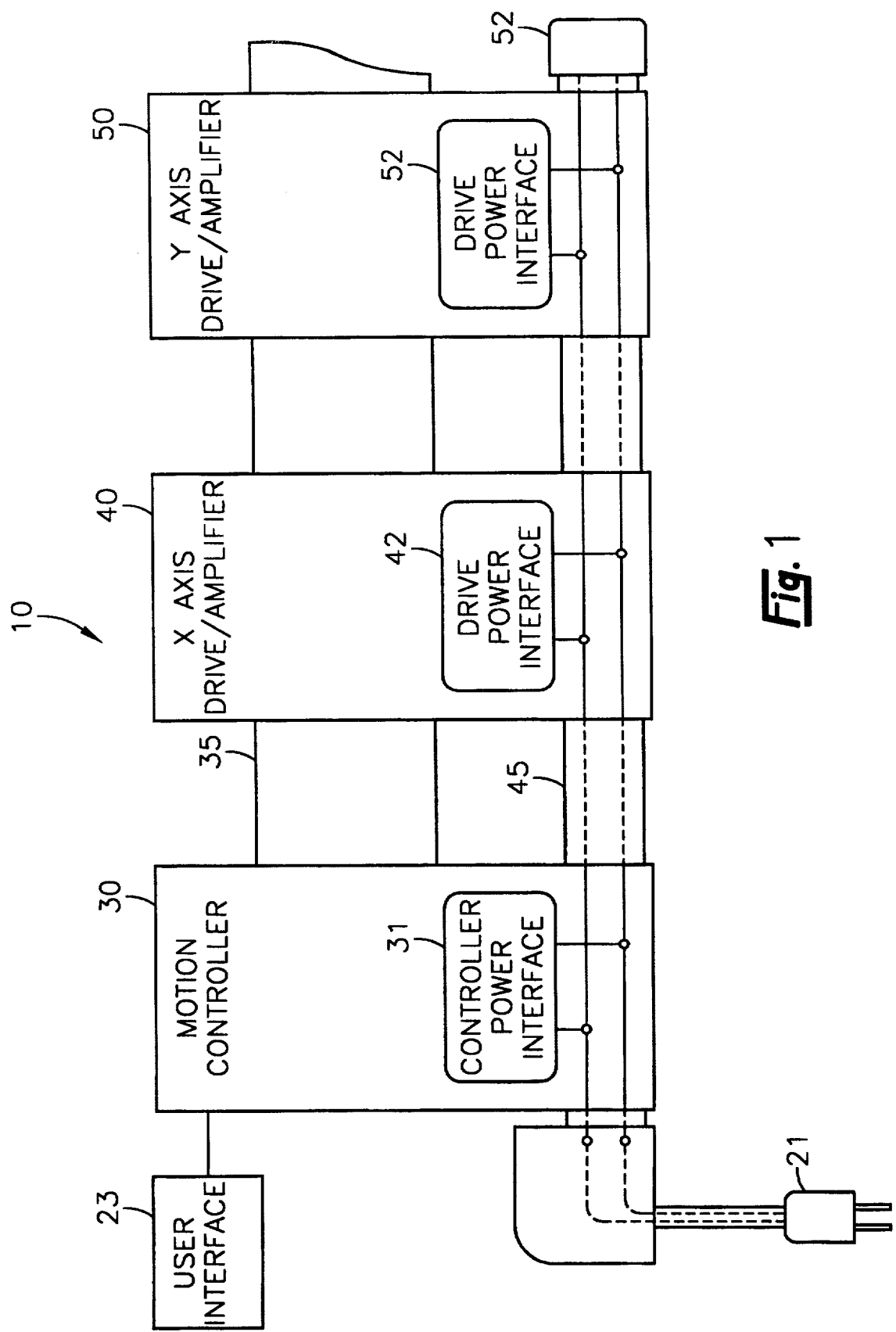
FIG. 1 is a functional block diagram of a multiaxis motion control system showing an arrangement for the supply of electrical power according to the present invention.
Figure 2:
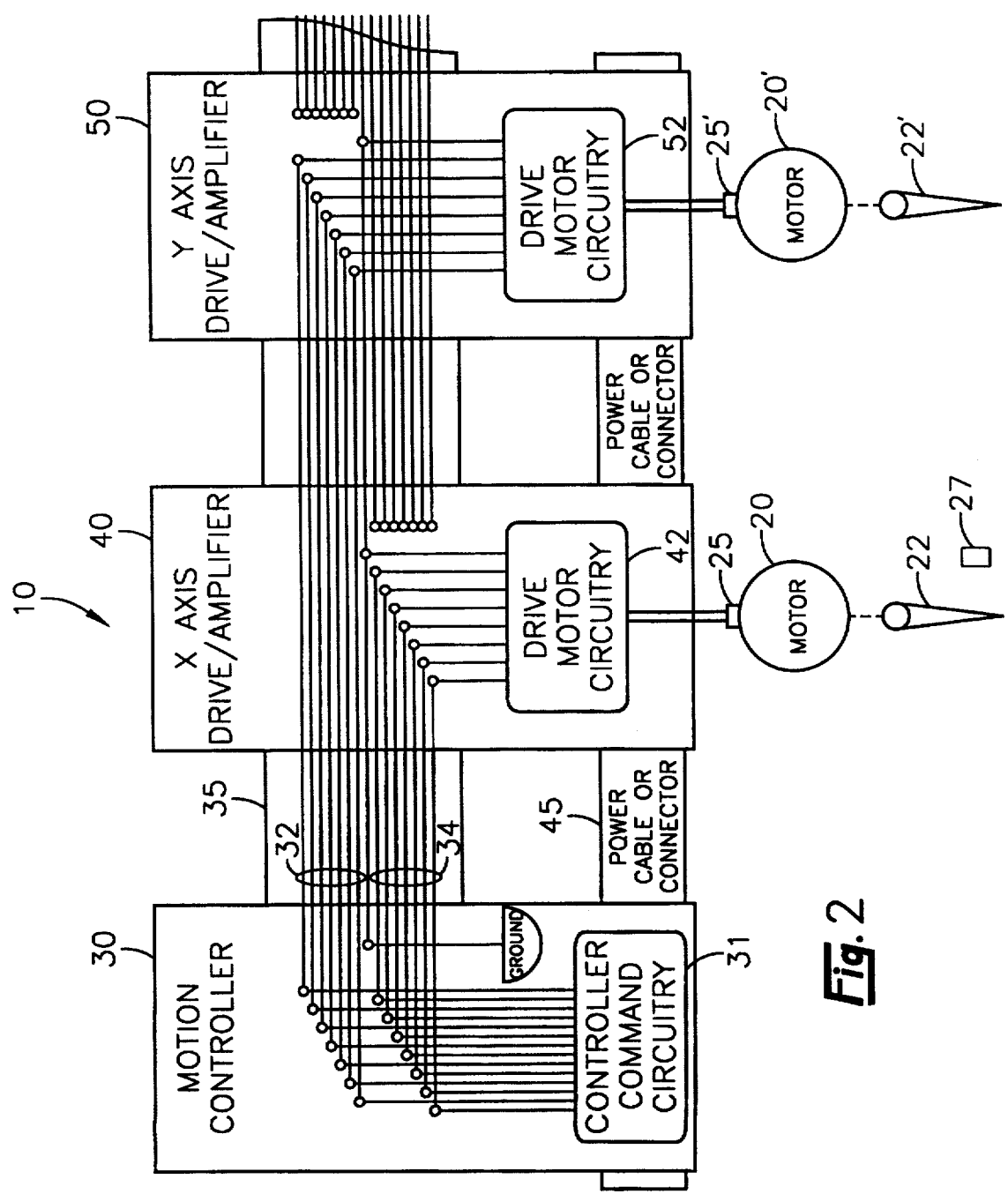
FIG. 2 is a functional block diagram of a multiaxis motion control system showing an arrangement for the supply of motion commands and other signals according to the present invention.
Figure 3:
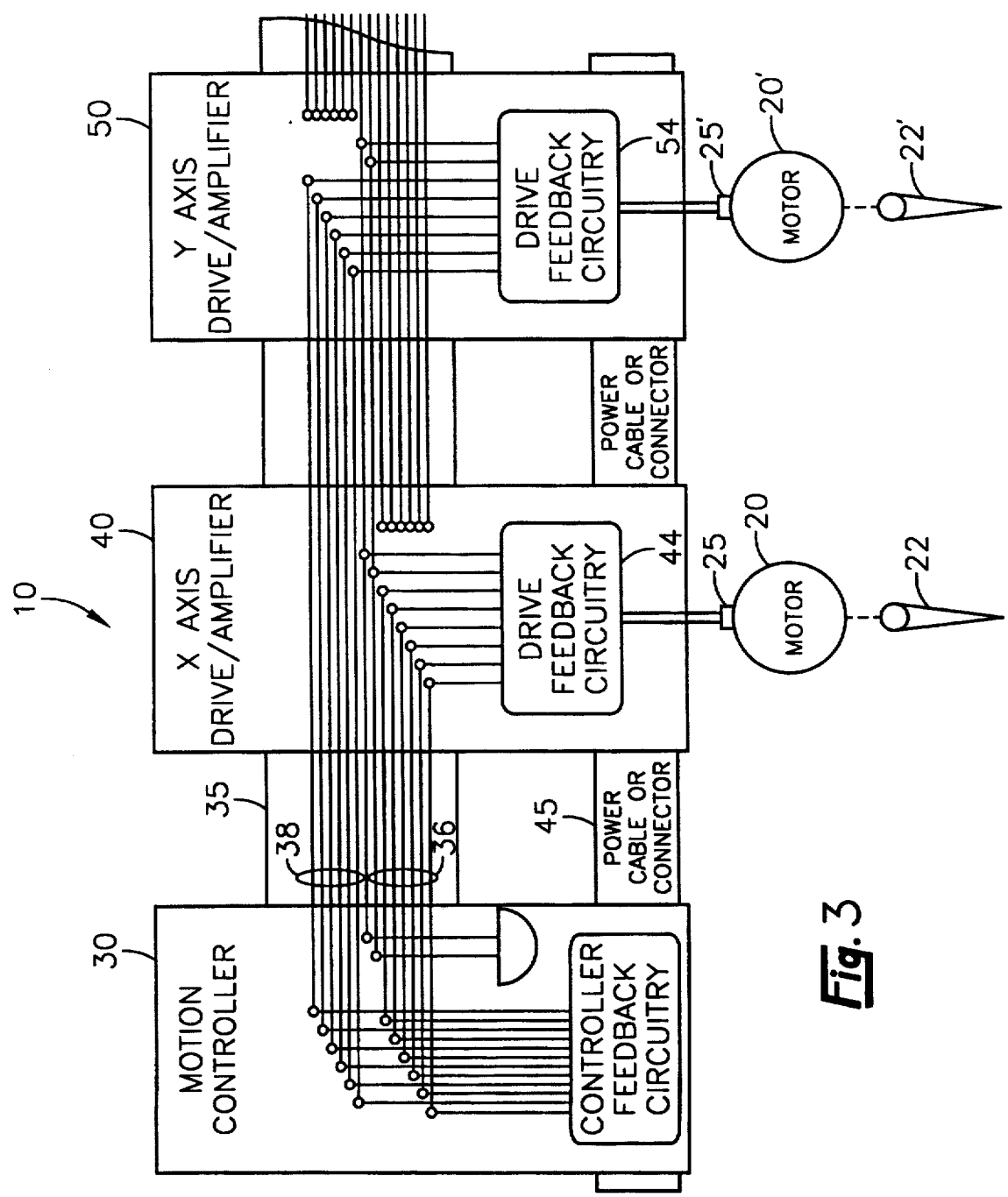
FIG. 3 is a functional block diagram of a multiaxis motion control system showing an arrangement for the passage of motor positional feedback according to the present invention.

With reference now to the drawings in which like reference characters designate like or similar parts throughout the several views, FIGS. 1–3 illustrate a motion control system 10 for controlling operation of one or more motors 20, 20' (such as servo motors or stepper motors) where each motor 20, 20' is connected to drive a structural member 22, 22' through a range of positions. The control system 10 of FIGS. 1–3 shows two axes, namely, an X-axis and a Y-axis. In an exemplary application of the invention, the motors 20, 20' are employed to drive structural elements of a robotic arm. In general, motion control is achieved in accordance with the invention by organizing the numerous electrical connections between the various components of the system 10 in such a way as to make it virtually impossible for anyone (including a motion control novice) to improperly connect the components of the motion control system 10.

Figure 4:
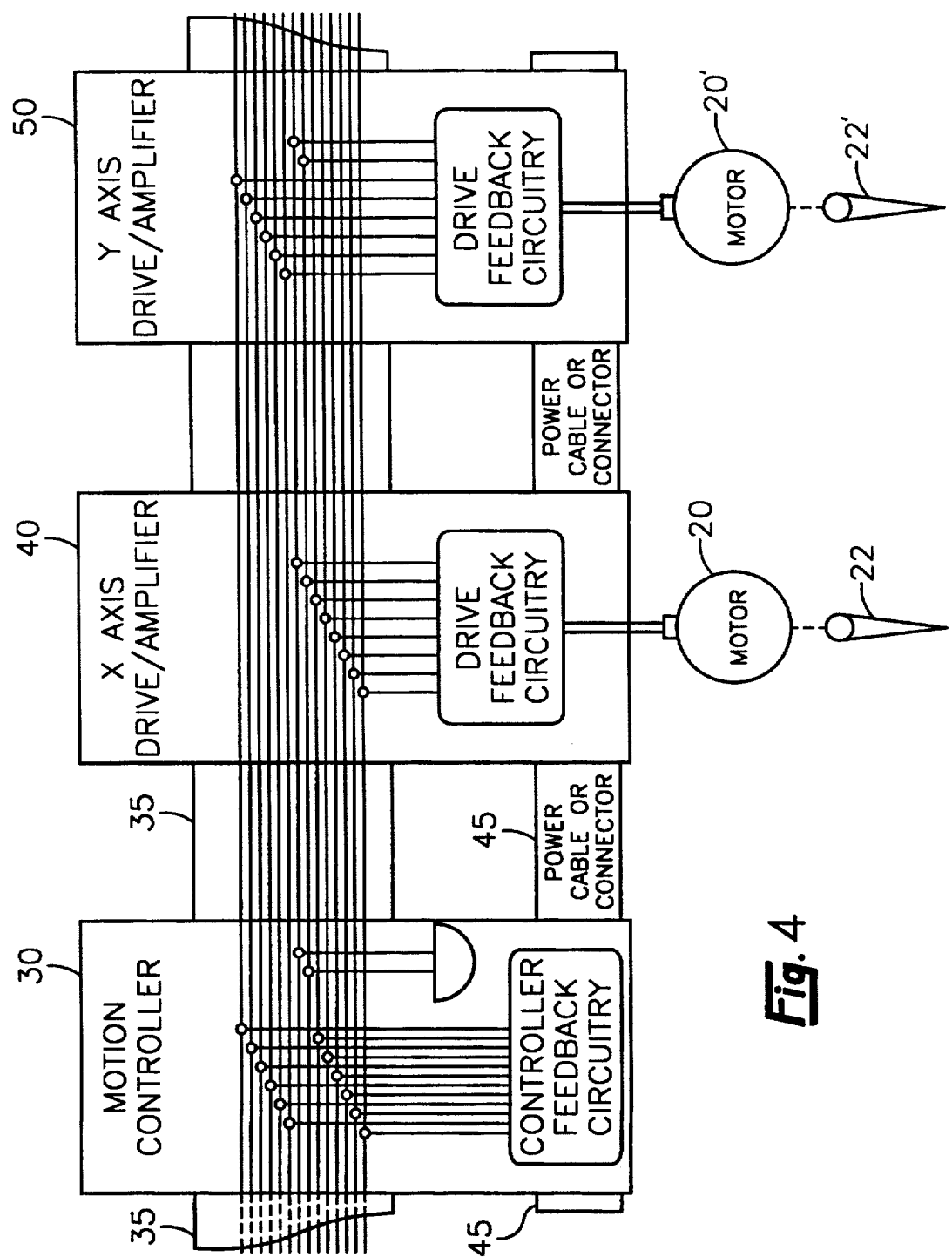
FIG. 4 is a functional block diagram of a multiaxis motion control system showing an alternate arrangement for the passage of motor positional feedback according to the present invention.

With continued reference to FIGS. 1–3, the components of the system 10 include a multiaxis motion controller 30 for producing motion control commands, or signals for controlling movement of the motors 20, 20'. Motion controllers suitable for use in the invention are available from Galil™ under model no. DMC 2030. DeltaTau™ and Compumotor™ also provide suitable multiaxis motion controllers. As used herein, the term "motor" refers to various power units which transform command signals from the motion controller 30 and energy from the drives 40, 50 into mechanical energy. These are most commonly electric servo motors (as shown in FIGS. 2–4) or stepper motors, but may also be in the form of hydraulic actuators, linear motors, or any device that imparts motion.

Each electric motor 20, 20' is connected to a motor drive 40, 50 for providing excitation to the motor. Motion commands for each of the motors 20, 20' are generated by the motion controller 30 and then passed to the motor drives 40, 50 via a conduit 35. Electrical power for the drives 40, 50 and other devices of the system 10 is preferably conducted by power conduit 45. High energy electrical power typically needed for operation of the electric motors 20, 20' is provided to conduit 45. If desired, all motion commands, electrical power, and other signals may be conducted by a single conduit which combines the lines of conduit 35 with the lines of conduit 45. However, when a single conduit is used, care should be taken to ensure that noise which might be produced by lines carrying electrical power is kept to a minimum. In some cases, lines carrying motion commands and/or lines carrying high levels of electrical power may need to be shielded to reduce noise to acceptable levels.

It will be understood that the term "line" as used herein should be regarded as both singular and plural. Depending on its context, "line" may refer to a single wire or electrical path, or it may collectively refer to a single plurality of wires or electrical paths.

As shown in FIG. 1, the motion controller 30 taps into and receives power (either AC or DC depending on the designer's preference) from power conduit 45 which, for example, carries power from a 110 volt ac source connected through plug 21. The motion controller 30 converts the power, as needed, by a controller power interface 31. Electrical power on power conduit 45 is also accessed by the power interface circuits 42, 52 in the X and Y-axis drives 40, 50 and any other drives which are included in the motion control system 10. In a preferred embodiment of the invention, a safety cap 52 is used to avoid hazardous exposure to the terminal end of the power conduit 45. An optional user interface 23 (such as a computer) may be used to control operation of the system 10. The computer 23 may also be used to program the motion controller 30.

Referring now to FIG. 2, motion control command signals produced by the motion controller 30 are output on lines 32 to the Y-axis drive 50. Likewise, command signals produced by the motion controller 30 for the X-axis are output on lines 34. Command signals are received by the drives 40, 50 and processed by drive motor circuitry 42, 52 which determines the amount of electrical power that is to be provided to the motor 20, 20'.

Electrical power provided to the motors 20, 20' in response to the command signals actuates the motors 20, 20' which in turn move structural elements 22, 22' to which the motors 20, 20' are attached.

Position monitors, such as encoders 25, 25' shown in FIGS. 2 and 3, are employed to monitor the position of the motors 20, 20' and to provide position feedback to the motion controller 30. As shown in FIG. 3, each of the drives include feedback circuitry 44, 54 which receives encoder outputs from encoders 25, 25' attached to the motors 20, 20' and continuously provides the encoder feedback information to the motion controller 30 on lines 36 for the X-axis drive 40 and on lines 38 for the Y-axis drive 50. The motion controller 30 includes command circuitry 31 which processes the continuous position feedback information to determine command signals which are provided to the drives 40, 50.

FIGS. 2 and 3 illustrate how command signals 32, 34 and feedback signals 36, 38 are not allowed to travel along signal conduit 35 to downstream devices. Signals can be passed to devices which are upstream from the device for which the signals are intended, but downstream devices do not receive signals which are intended for a device which is located upstream. For example, command signals for the X-axis drive 40 on lines 34 are not allowed to pass beyond the X-axis drive 40 to the Y-axis drive 50. Likewise, signals on lines 32 which are intended for the Y-axis drive 50 are passed by the X-axis drive 40 along conduit 35, but the signals are not allowed to pass beyond the Y-axis drive 50 where they are to be used. Feedback signals on lines 36 and 38 of FIG. 3 are similarly prevented from traveling downstream from the motion controller 30 beyond the particular drive for which the signals are intended.

In an alternate embodiment of the invention shown in FIG. 4, signals which are conducted by conduit 35 are allowed to travel upstream and downstream from each device. As can be seen in FIG. 4, signals which are used by the X-axis drive 40 are also passed along conduit 35 to the Y-axis drive 50. This embodiment enables the motion controller 30 to be placed at any position within the series of devices.

Figure 5:
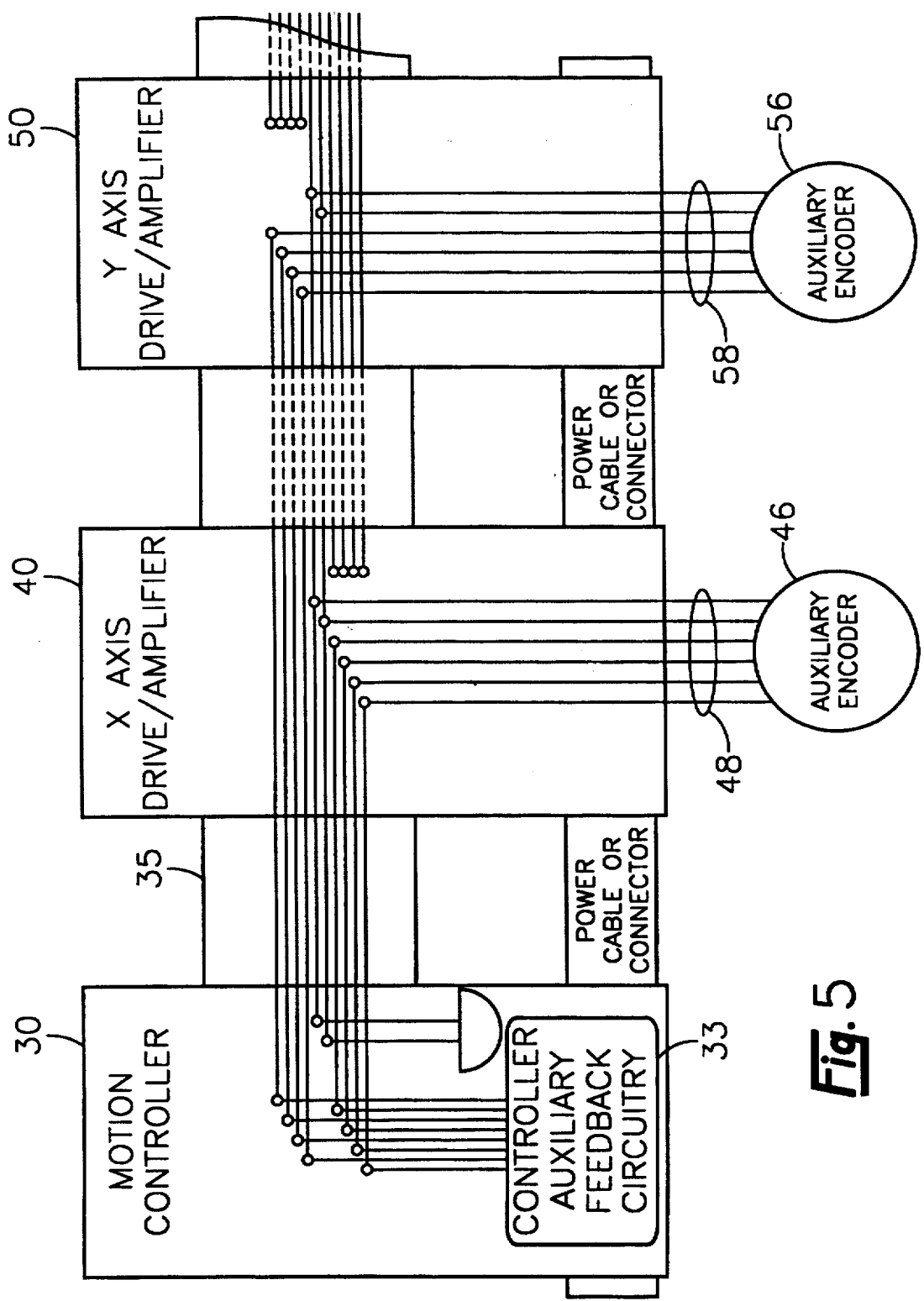
FIG. 5 is a functional block diagram of a multiaxis motion control system showing an arrangement for the passage of auxiliary positional feedback according to the present invention.

In FIG. 5, auxiliary encoders 46, 56 are employed to provide additional position feedback for use by the motion controller 30. In a preferred embodiment shown in FIG. 2 and 3, primary encoders 25, 25' are located on the axis motor 20, 20' itself. Auxiliary encoders 46, 56 are placed on the actual load, or structural members 22, 22' to provide feedback to determine the differences in position of the structural member 22, 22' and the position reported by the primary encoder 25, 25'. This is useful for backlash compensation or in situations where a high degree of accuracy and precision is needed. The auxiliary encoder signals on lines 48 and 58 are simply passed by the respective drive 40, 50 to the motion controller auxiliary feedback circuitry 33. If desired, a dedicated module may be connected to conduit 35 to route auxiliary encoder feedback signals to the motion controller 30. A dedicated I/O module may also be connected to conduit 35 to route I/O signals, such as the output of a proximity sensor 27 shown in FIG. 2, to the motion controller 30. In a preferred embodiment, however, I/O switches dedicated for a particular axis are built into the respective axis drive 40, 50. A proximity sensor output can be used by the motion controller 30 to limit movement of a structural member 22 controlled by an axis motor 20.

The various devices of a motion control system 10 according to the present invention may be assembled in any order without the risk of damage to the system 10. In effect, the present invention provides for a "plug-n-play" system which requires little or no technical expertise to assemble, install, and operate the system 10. This significant advance in the art is accomplished by configuring the various devices so that they may be connected in random order with no effect on the overall operability of the system 10.

Figure 6:
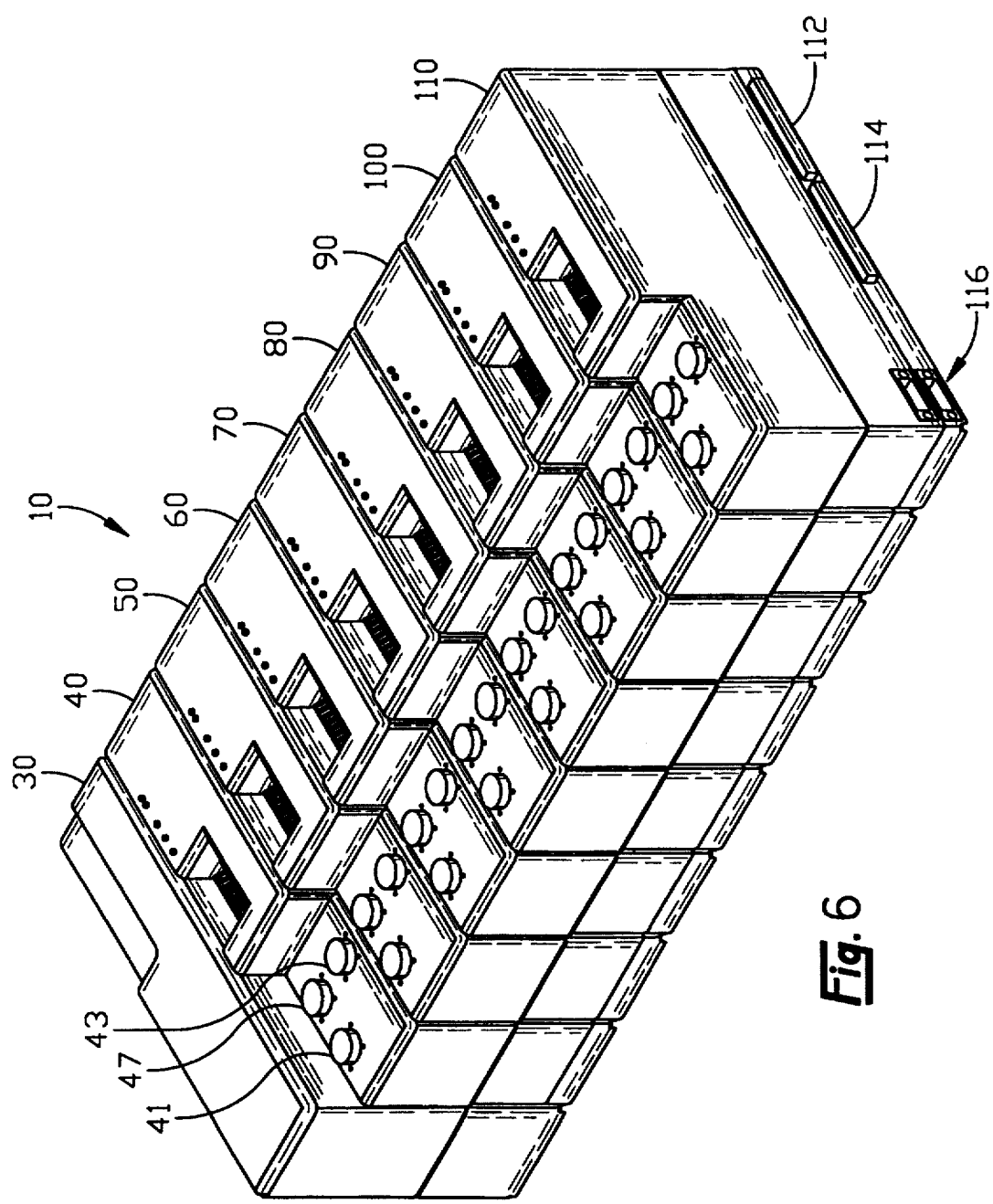
FIG. 6 is a perspective view of a modular eight-axis motion control system including a motion control module and eight motor drive modules interconnected by means of a substantially rigid signal conduit according to the present invention.

FIG. 6 shows a perspective view of a preferred embodiment of an 8-axis system 10 according to the invention. The system 10 of FIG. 6 includes easy to assemble modules for the motion controller 30 and the eight motor drives 40, 50, 60, 70, 80, 90, 100, and 110. An electric motor for each axis of the system 10 is connected to a drive 40–110 by electric cable with easily connected cannon plugs. Each drive 40–110 includes a power receptacle, such as power receptacle 41 of the X-axis drive 40, for providing electrical excitation to the motor. In addition, each drive 40–110 includes a primary feedback receptacle 43 through which position feedback from a primary encoder attached to the motor is received and passed on to the motion controller 30. An auxiliary feedback receptacle 47 is also provided in the event auxiliary feedback is desired, as previously described.

The modular system design shown in FIG. 6 enables the motion controller 30 and drives 40–110 to be easily added or removed from the system 10 by simply sliding the modules together or apart. The motion controller 30 and drives 40–110 include a substantially rigid substrate, or coupler which contains the electrical lines and connectors necessary to electrically inertied the controller 30 and drives 40–110 along conduit 35 as described above in relation to FIGS. 1–3. In FIG. 6, reference numbers 112 and 114 are used to identify the electrical connectors of conduit 35 for one side of the coupler for the H-axis drive 110. Alternatively, a single connector with a sufficient number of pins may be used in lieu of the two connectors 112, 114 shown in FIG. 6. Connectors for the electrical power conduit 45 for the H-axis drive are shown generally at 116.

By use of the term "intertie," what is meant is that the signal conduit 35 carrying motion commands, feedback, electrical power, and other signals is configured in such a way that the order of position of each drive 40–110 along signal conduit 35 (and also along power conduit 45) does not affect operability of the system 10. In other words, by simply sliding the modules together and apart, the eight axes of the system 10 shown in FIG. 6 may be arranged in the order of X-Y-Z-W-E-F-G-H (as shown), or Z-E-H-X-Y-G-F-W, or H-W-X-F-Y-E-G-Z, or any other arrangement. The order of arrangement of the various axes simply does not matter. Thus, little or no technical expertise is needed to assemble and install the system 10. An additional advantage realized by the invention is that assembly of the system 10 requires no tools. The modules are simply connected to one another at their connectors.

Figure 7:
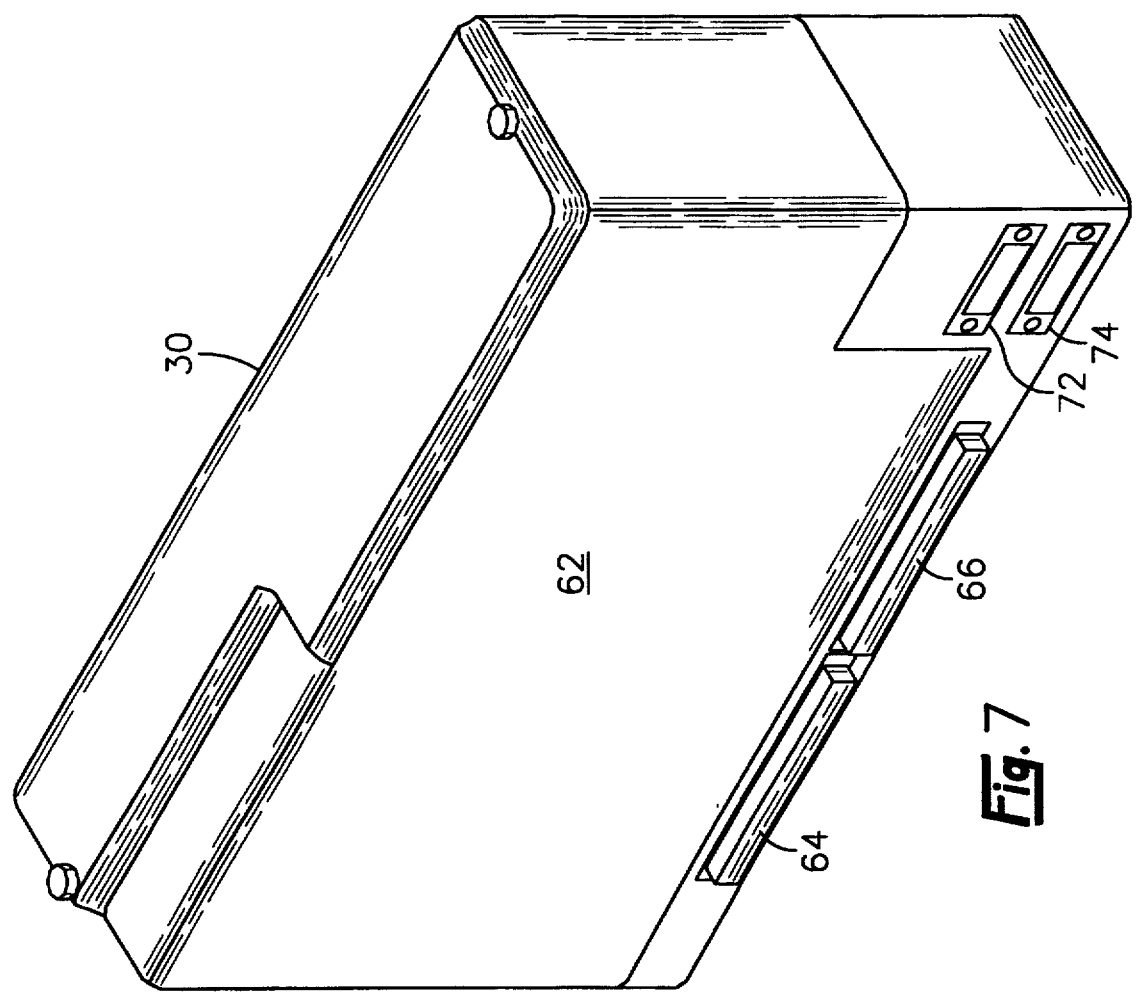
FIG. 7 is a perspective view of motion control module according to the present invention.

FIG. 7 shows a perspective view of the modular motion controller 30 of FIG. 6. In a preferred embodiment, the electronics within the motion controller 30 are protected by a shell 62. Electrical connectors 64, 66, which correspond to the motion controller 30 embodiment shown in FIG. 4, are visible near the bottom of the motion controller 30. Connectors 64, 66 are used for connecting an axis drive or other device to the signal conduit 35 as shown in FIG. 4. Connectors 72, 74 provide power connections to the power conduit 45 of FIG. 4.

Figure 8:
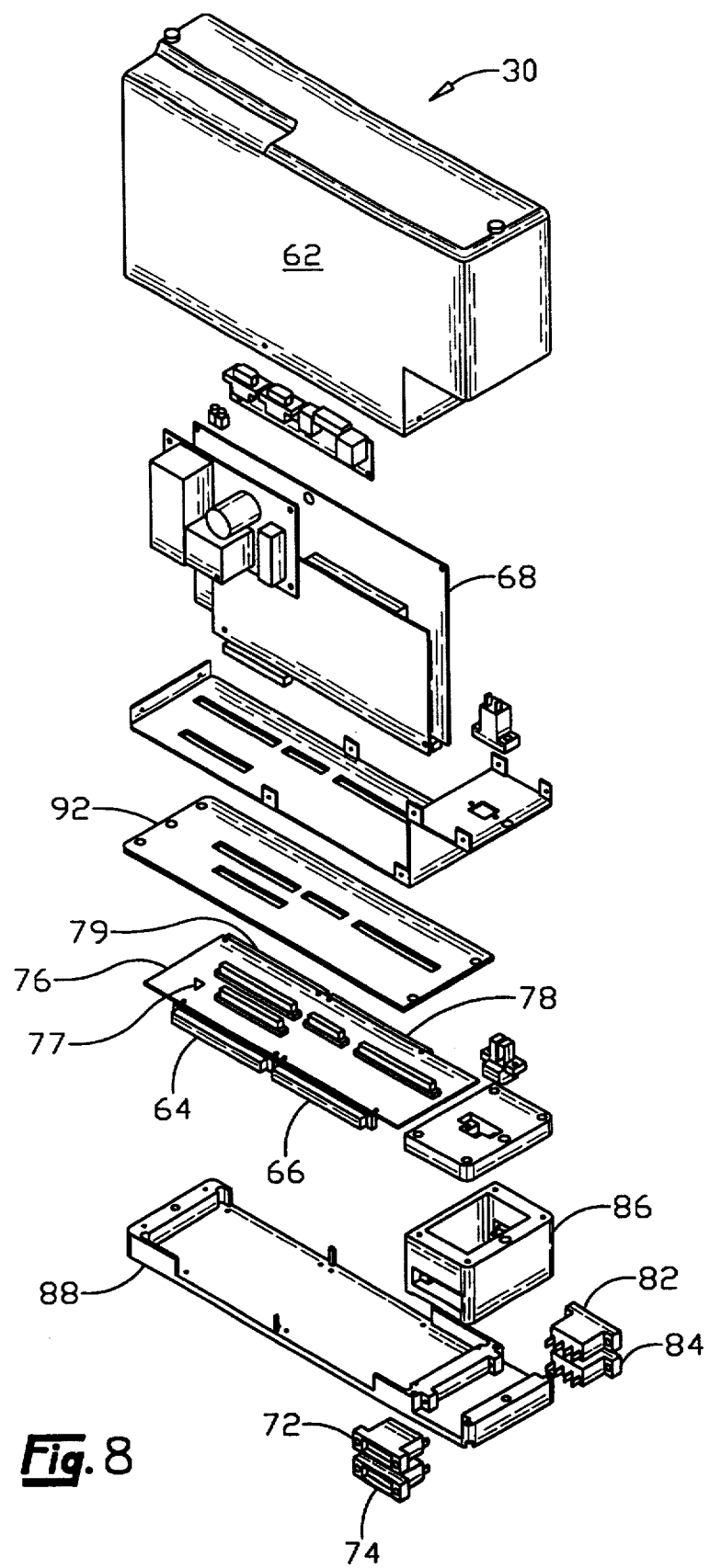
FIG. 8 is an exploded view of the motion control module of FIG. 7.

An exploded view of the motion controller 30 is shown in FIG. 8. As can be seen, electrical connectors 64, 66 are attached to a coupler 76. The coupler 76 is constructed as a substantially rigid substrate having one or more layers of electrically conductive lines for conducting motion command signals, encoder feedback signals, and other signals which are to be passed along the signal conduit 35 as shown in FIG. 4. A second pair of connectors 78, 79 can be seen on the opposite side of the coupler 76 to enable a device to be connected to either side of the motion controller 30. A power block 86 routes power to all the devices of the system 10 and includes a pair of connectors 72, 74 for passing power to devices connected on one side of the motion controller 30 and a second pair of connectors 82, 84 for passing power to devices connected to the other side. The coupler 76 is positioned between a coupler base 88 and a coupler cover 92. Also, as shown in FIG. 8, the motion controller 30 includes a mother board 68 which connects to the coupler 76 via one or more connectors (shown generally at 77) to send and receive signals on conduit 35.

Figure 9:
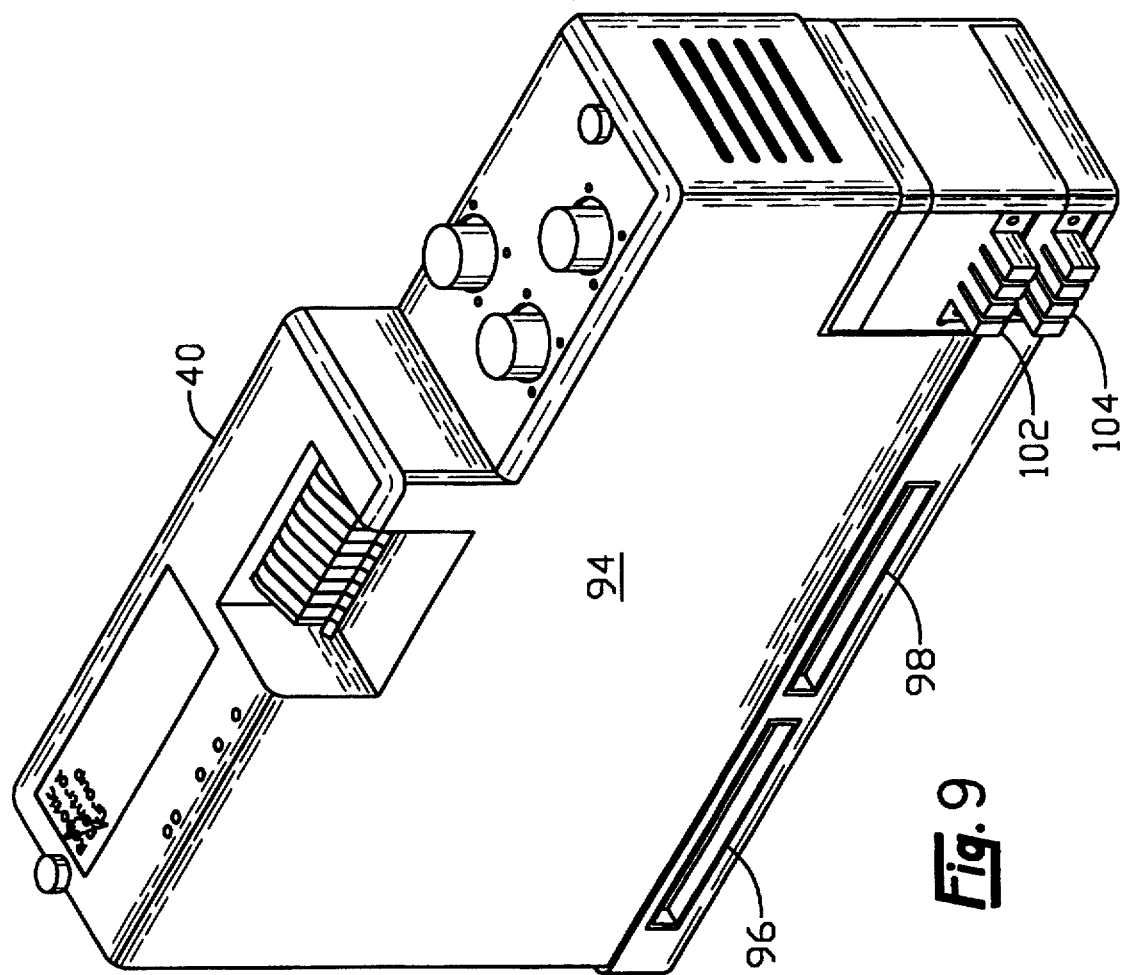
FIG. 9 is a perspective view of a motor drive module according to the present invention.

FIG. 9 shows a perspective view of a motor drive according to the invention. For purposes of illustration, the motor drive of FIG. 9 is identified as the X-axis drive of FIG. 6 -it being understood that the other drives 50–110 are similarly configured. The drive 40 includes a drive shell 94 for enclosing the electronics and structural elements of the drive 40. Electrical signal connectors 96, 98 are used to connect the drive 40 to electrical connectors 78, 79 (FIG. 8) of the motion controller 30 as shown in FIG. 6, or if desired the drive 40 may be connected to another of the drives 50–110 shown in FIG. 6 (or any other module, such as the I/O module of FIG. 12) if a different order of arrangement of the drives 40–110 is chosen. The drive 40 also includes electrical power connectors 102, 104 for receiving electrical power on power conduit 45, as shown in FIGS. 1–4 for use in driving the X-axis motor 20 (FIGS. 2–4).

Figure 10:
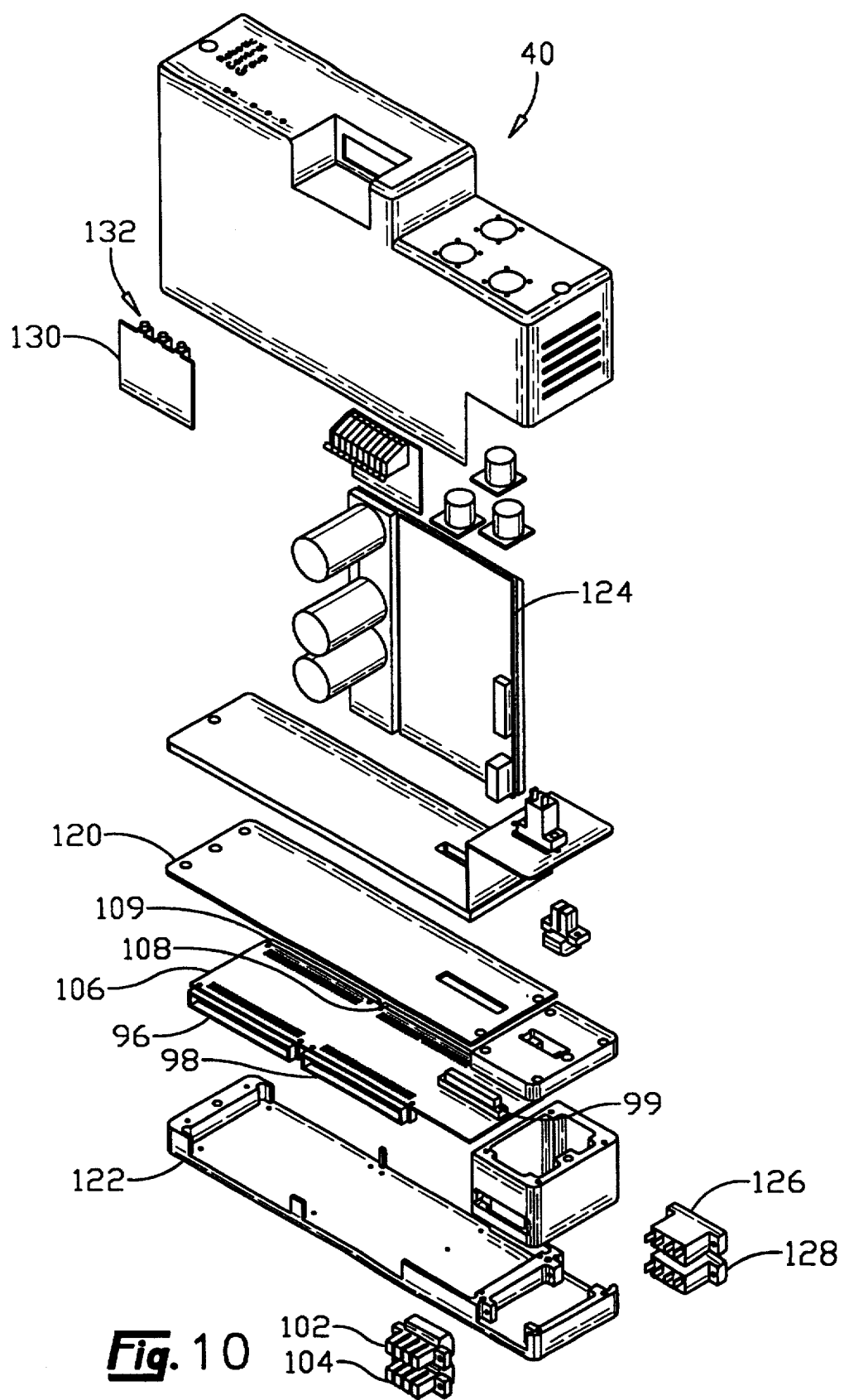
FIG. 10 is an exploded view of the motor drive module of FIG. 9.

Referring now to FIG. 10, an exploded view of the drive 40 is shown. The drive 40 includes a drive coupler 106 which includes the electrical lines necessary to carry command signals from the motion controller 30, encoder feedback from the motor(s) of the system 10, and other signals that are to be conducted along the signal conduit 35. The drive coupler 106 is similar to the motion controller coupler 76 of FIG. 8 in that both are fabricated from a substantially rigid material, with electrically conductive lines in one or more layers of the material. Like the motion controller coupler 76, the drive coupler 106 includes connectors 96, 98 on one side and connectors 108, 109 on the opposite side to enable the drive coupler 106 to be connected with the coupler(s) of another drive, the motion controller 30, or any other type of module. The coupler 106 is held is place within the drive 40 between a coupler cover 120 and a coupler base 122. A drive circuit board 124 containing the electronics necessary for operation of the drive 40 (including drive motor circuitry, drive feedback circuitry, and drive power interface circuitry) connects with the drive coupler 106 via connector 99. Power connectors 102, 104 provide electrical power connection to the power conduit 45 on one side of the drive 40 and power connectors 126, 128 provide connection to the power conduit 45 on the opposite side of the drive 40. An LED driver board 130 is provided to drive a plurality of LEDs (shown generally at 132) to provide a visual indication of the operational status of the drive 40.

Figure 11:
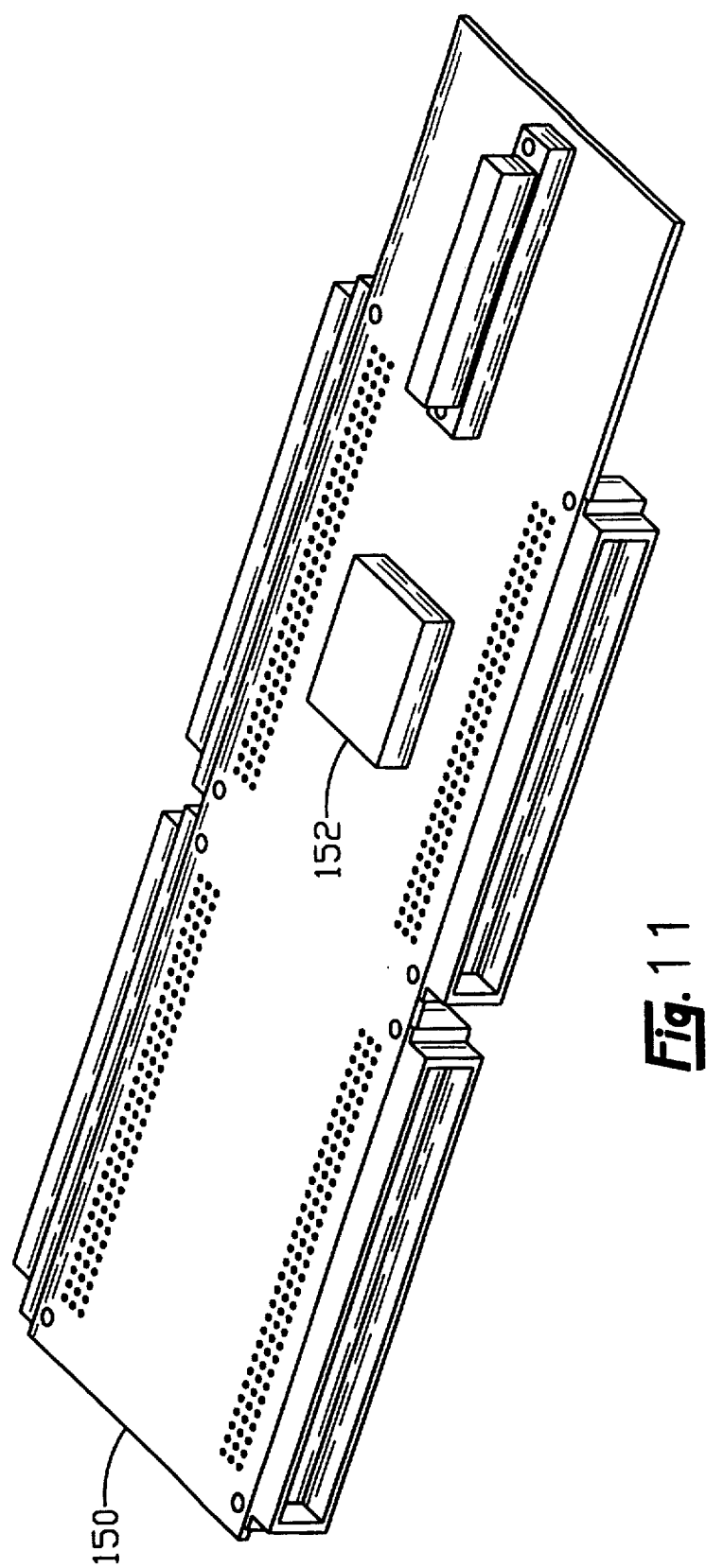
FIG. 11 is a perspective view of a drive coupler according to the present invention.

For the preferred embodiments of the signal conduit 35 shown in FIGS. 1–4, the drive coupler 106 for each drive 40–110 will vary somewhat. In an alternate embodiment, the drive couplers for the axis drives are substantially identical to one another. As shown in FIG. 11, a drive coupler 150 which may be employed in each axis drive is shown. The coupler 150 includes a selector 152 for executing a predetermined selection of the electrically conductive lines of the signal conduit 35 for connection with the motor drive containing the coupler 150. The selector 152 may include a plurality of dip switches, the positions of which are manually set to connect the drive with certain lines of conduit 35 as dictated by the particular axis to which the drive is assigned. Alternatively, the selector 152 may include a signal processor which can be programmed (such as through the user interface 23 shown in FIG. 1) to select desired ones of the lines of the signal conduit 35.

Figure 12:
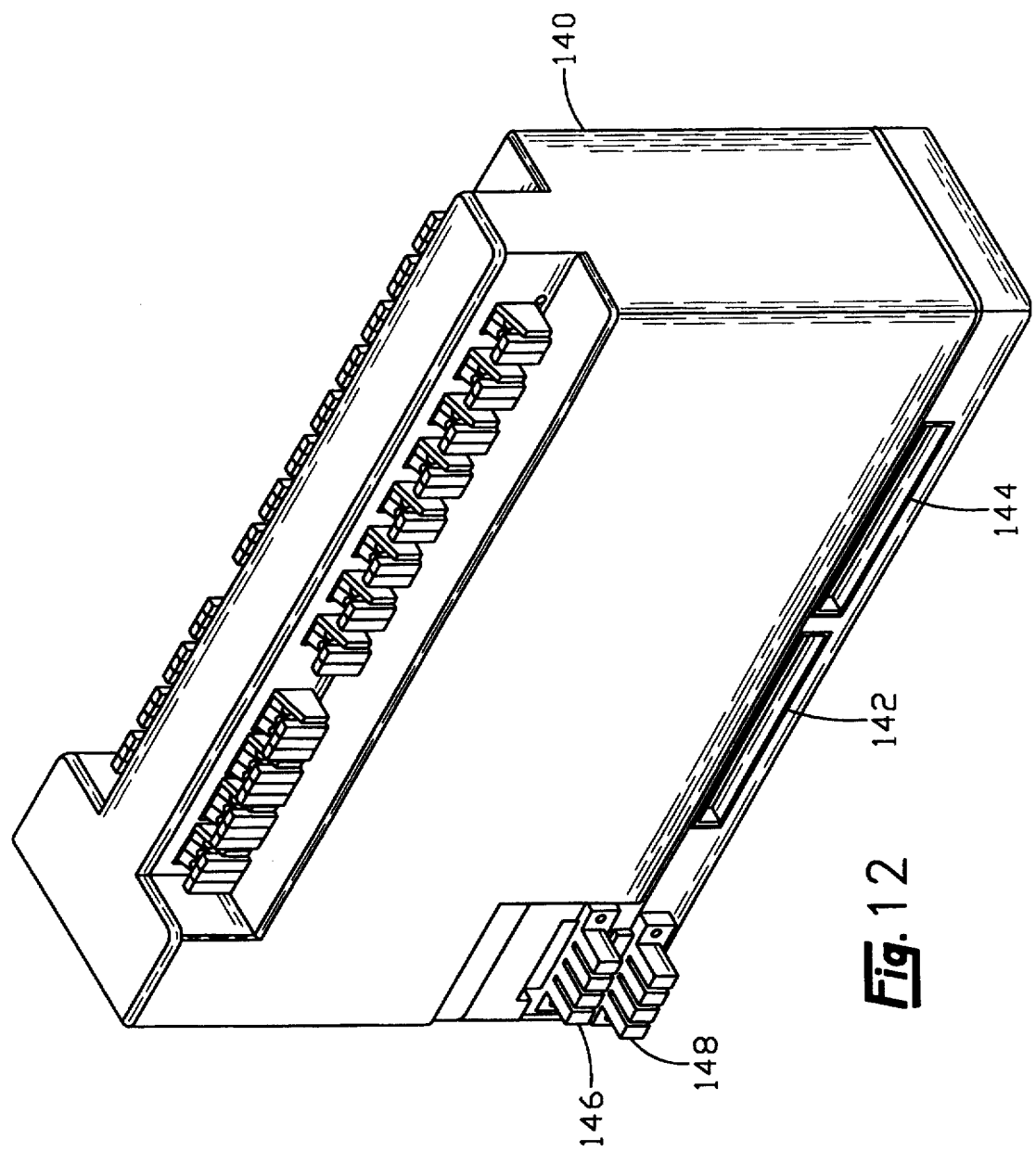
FIG. 12 is a perspective view of an I/O module according to the present invention.

Various optional modules may also be included in a motion control system 10 according to the invention. For example, FIG. 12 shows an optional I/O module 140, which may be used to provide an I/O interface with the system 10 for both analog and digital inputs and outputs. The I/O module 140 is configured similarly to the motion controller 30 and drives 40 and includes signal connectors 142, 144 forming part of an I/O coupler with multiple lines for passing signals along signal conduit 35 and power connectors 146, 148 for accessing and conducting power provided by the power conduit 45. Various I/O signals which may be routed across the signal conduit 35 include, for example, sensor outputs, manually activated start/stop switches, signals for turning lights on and off, and other such signals. Other optional modules which may be employed in the system 10 include a universal drive module and a universal control module which work with most drives and controls on the market today. The universal drive modules are interfaces from the coupler 150 (FIG. 11) that allow custom or unsupported drives to "plug-in" to the coupler 150 with a cable or wiring. The coupler 150 still passes the communication signals to the motion controller 30. An optional power supply module may also be provided to assist with large power needs.

While a preferred embodiment of a multiaxis motion control system 10 in accordance with the invention employs a signal conduit 35 in the form of a substantially rigid substrate containing one or more layers of conductive lines, the signal conduit 35 (as well as the power conduit 45) may include one or more flexible segments for intertying the modules of the system 10. For example, the motion controller 30 and drives 40–110 of FIG. 6 (and all other modules of the system 10 not shown in FIG. 6) may be connected one to the other by means of a flexible ribbon cable containing a plurality of conductive lines. Such flexible cables may be employed to augment the intertying of one or more modules, or a flexible cable may be used in lieu of the substantially rigid couplers described above, such as drive coupler 106 shown in FIG. 10.

It will be appreciated that while a preferred embodiment of the invention employs modular construction of the motion controller 30, drives 40–110, I/O module 140, etc., other configurations of these motion control system devices may be employed in accordance with the invention. For example, circuit boards for the various devices of the system 10 may be connected to a substantially rigid substrate with electrically conductive lines in a single layer or multiple layers, or a plurality of intertied substrates as described above, with a single enclosure or with no enclosure.

A "plug-and-play" multiaxis motion control system 10 in accordance with the invention significantly enhances the ease of installation and maintenance over traditional systems. The system 10 requires little or no technical expertise to assemble, install, and operate, thus reducing the time, costs, and training associated with installing and maintaining motion control systems.

It is contemplated and will be apparent to those skilled in the art from the foregoing specification, drawings, and examples that modifications and/or changes may be made in the embodiments of the invention. Accordingly, it is expressly intended that the foregoing are only illustrative of preferred embodiments and modes of operation, not limiting thereto, and that the true spirit and scope of the present invention be determined by reference to the appended claims.

What is claimed is:

1. An expandable coupler system for electrically coupling signals between a motion controller and at least one motor drive of a motion control system, the coupler system comprising:
   a conduit having a plurality of electrically conductive lines for conducting signals between the motion controller and the at least one motor drive, said conduit including:
      a controller connector for connecting the motion controller to said conduit;
      a drive connector for connecting the at least one motor drive to said conduit; and
      an expansion connector for connecting a further motion controller or motor drive; and
   wherein said conduit includes a substantially rigid substrate having a plurality of electrically conductive lines formed in one or more layers of the substrate.

2. The coupler system of claim 1 wherein said conduit includes a flexible electrical cable having a plurality of electrically conductive lines.

3. The coupler system of claim 1 wherein said motion control system includes a multiaxis motion control system having a plurality of motor drives for driving a plurality of motors.

4. An expandable motion control system for controlling operation of one or more motors, each of said one or more motors being movable through a range of positions and being attached to a structural member to control movement of the structural member, the system comprising:
   a substantially rigid substrate having:
      a plurality of electrically conductive lines formed in one or more layers of said substrate; and
      first and second connectors for providing electrical connection with electrically conductive lines formed in the substrate;
   a motion controller for providing motion control signals on electrically conductive lines of said substrate by way of the first connector;
   a power connector for providing electrical power signals on electrically conductive lines of said substrate; and
   a first motor drive attached to said substrate for receiving motion control signals and electrical power signals and driving a first motor through its range of positions in response to the motion control signals;
   wherein said second connector is configured for being connected to a further motion controller or motor drive.

5. The motion control system of claim 4, further including a multiaxis motion control system having a plurality of motor drives for driving a plurality of motors.

6. The motion control system of claim 4 wherein said substrate further includes a plurality of interconnected, substantially rigid couplers.

7. The motion control system of claim 4, further including a power conduit having a plurality of electrically conductive lines for conducting electrical power signals for powering said first motor.

8. A multiaxis motion control system for controlling operation of a plurality of motors, each of said plurality of motors being movable through a range of positions and being attached to a structural member to control movement of the structural member, the system comprising:
   a substantially rigid substrate having a plurality of electrically conductive lines formed in one or more layers of said substrate;
   a multiaxis motion controller for providing motion control signals on electrically conductive lines of said substrate;
   a power connector for providing electrical power signals on electrically conductive lines of said substrate; and
   a plurality of motor drives, each of said motor drives being attached to said substrate for receiving motion control signals and electrical power signals and driving a motor through its range of positions in response to the motion control signals.

9. The control system of claim 8 wherein said substrate further includes a plurality of interconnected, substantially rigid couplers with electrically conductive lines formed in one or more layers.

10. The control system of claim 9 wherein said plurality of interconnected, substantially rigid couplers further includes a motion control coupler configured for attachment of a motion controller and a plurality of motor drive couplers, each of said motor drive couplers being configured for attachment of a motor drive.

11. The control system of claim 10 wherein each motor drive coupler is substantially identical and includes a selector for selecting predetermined ones of said electrically conductive lines for connection with a motor drive which is attached to the coupler.

12. The control system of claim 11 wherein said selector includes a plurality of dip switches.

13. The control system of claim 11 wherein said selector includes a programmable electronic processor.

14. The control system of claim 9, further including a flexible electrical cable interconnecting two of said couplers.

15. The control system of claim 8, further including a user interface for controlling operation of the system.

16. The control system of claim 9, further including a power conduit having a plurality of electrically conductive lines for conducting electrical power signals for powering said plurality of motors.

17. A multiaxis motion control system for controlling operation of a plurality of motors, each of said plurality of motors being movable through a range of positions and attached to a structural member to control movement of the structural member, the system comprising:

a multiaxis motion controller for providing motion control signals;

a power supply for providing electrical power signals;

an electrical conduit having a plurality of electrically conductive lines for conducting said motion control signals and said electrical power signals, said conduit including electrically conductive lines formed on a substantially rigid substrate in one or more layers of said substrate;

a plurality of motor drives connected to said conduit for receiving motion control signals and electrical power signals and driving said plurality of electric motors through their ranges of positions in response to the motion control signals;

a plurality of monitors for producing monitor signals substantially continuously corresponding to the positions of the motors, said monitor signals being conducted by said conduit to said motion controller for use in producing motion control signals; and wherein said motion controller, said power supply, said plurality of motors, said plurality of monitors, and said plurality, of motor drives are connected along said conduit such that the order of position of each motor drive along said conduit does not affect operability of the system.

18. The motion control system of claim 17 wherein said conduit includes electrically conductive lines formed in a flexible cable.

19. The motion control system of claim 17 wherein said plurality of motors includes one or more servo motors.

20. The motion control system of claim 17 wherein said plurality of motors includes one or more stepper motors.

21. The motion control system of claim 17, further including a sensor for sensing the position of a structural member being moved by a motor, said sensor providing a sensor signal corresponding to the sensed position of the structural member, said motion controller controlling operation of the system based in part on the sensor signal.

22. The motion control system of claim 21 wherein said sensor is a proximity sensor.

23. The control system of claim 17, further including a power conduit having a plurality of electrically conductive lines for conducting electrical power signals for powering said plurality of motors.

* * * * *